(12) United States Patent
Sennett et al.

(10) Patent No.: US 10,510,068 B2
(45) Date of Patent: *Dec. 17, 2019

(54) SYSTEM AND METHOD FOR SELLING ITEMS VIA A WIRELESS MOBILE TELECOMMUNICATIONS SYSTEM

(71) Applicant: AT&T Mobility II LLC, Atlanta, GA (US)

(72) Inventors: DeWayne Allan Sennett, Redmond, WA (US); Brian Kevin Daly, Seattle, WA (US); Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,690

(22) Filed: Jul. 18, 2016

(65) Prior Publication Data

US 2016/0328694 A1 Nov. 10, 2016

Related U.S. Application Data

(63) Continuation of application No. 14/282,185, filed on May 20, 2014, now Pat. No. 9,396,495, which is a continuation of application No. 11/742,228, filed on Apr. 30, 2007, now Pat. No. 8,737,974.

(51) Int. Cl.
| | |
|---|---|
| *H04L 29/06* | (2006.01) |
| *G06Q 20/32* | (2012.01) |
| *G06Q 30/00* | (2012.01) |
| *G06Q 30/02* | (2012.01) |
| *G06Q 30/08* | (2012.01) |

(52) U.S. Cl.
CPC ......... *G06Q 20/325* (2013.01); *G06Q 20/322* (2013.01); *G06Q 30/00* (2013.01); *G06Q 30/0264* (2013.01); *G06Q 30/08* (2013.01); *G06Q 30/0257* (2013.01)

(58) Field of Classification Search
CPC ...................................................... G06Q 30/08
See application file for complete search history.

(56) References Cited

U.S. PATENT DOCUMENTS

| | | | | |
|---|---|---|---|---|
| 6,668,377 | B1* | 12/2003 | Dunn | ................. H04N 7/17318 348/E7.071 |
| 8,737,974 | B1 | 5/2014 | Sennett et al. | |
| 2001/0002209 | A1* | 5/2001 | Han | .................... H04M 3/4878 379/142.01 |
| 2003/0231749 | A1 | 12/2003 | Ansley et al. | |
| 2005/0119963 | A1* | 6/2005 | Ko | ..................... G06Q 30/0633 705/37 |

(Continued)

OTHER PUBLICATIONS

Office Action dated Dec. 7, 2009 in U.S. Appl. No. 11/742,228.

(Continued)

*Primary Examiner* — Justin Y Lee
(74) *Attorney, Agent, or Firm* — Hartman & Citrin LLC

(57) ABSTRACT

Items are sold via a wireless mobile telecommunications network in which multimedia presentations describing items offered for sale are broadcast for reception by wireless mobile devices. Users of the devices can transmit responses indicating requests to buy the items or bid for them in auctions.

18 Claims, 3 Drawing Sheets

(56) References Cited

U.S. PATENT DOCUMENTS

| | | | |
|---|---|---|---|
| 2005/0131837 A1* | 6/2005 | Sanctis | G06Q 20/12 705/64 |
| 2006/0206408 A1 | 9/2006 | Nassiri | |
| 2006/0242056 A1 | 10/2006 | Walker et al. | |
| 2006/0274896 A1* | 12/2006 | Livesay | H04L 63/0421 380/255 |
| 2007/0270165 A1 | 11/2007 | Poosala | |
| 2008/0270251 A1 | 10/2008 | Coelho et al. | |
| 2009/0012878 A1 | 1/2009 | Tedesco et al. | |
| 2014/0156640 A1* | 6/2014 | Bombolowsky | G06F 17/30991 707/722 |
| 2014/0244421 A1 | 8/2014 | Porat | |
| 2014/0365288 A1* | 12/2014 | Liu | G06Q 30/02 705/14.26 |

OTHER PUBLICATIONS

Office Action dated Apr. 7, 2010 in U.S. Appl. No. 11/742,228.
Office Action dated Mar. 13, 2012 in U.S. Appl. No. 11/742,228.
Office Action dated Jul. 24, 2012 in U.S. Appl. No. 11/742,228.
Office Action dated Jul. 5, 2013 in U.S. Appl. No. 11/742,228.
Notice of Allowance dated Jan. 3, 2014 in U.S. Appl. No. 11/742,228.
Office Action dated Dec. 10, 2015 in U.S. Appl. No. 14/282,185.
Notice of Allowance dated Mar. 14, 2016 in U.S. Appl. No. 14/282,185.

* cited by examiner

SYSTEM AND METHOD FOR SELLING ITEMS VIA A WIRELESS MOBILE TELECOMMUNICATIONS SYSTEM

CROSS-REFERENCE TO RELATED APPLICATIONS

This application is a continuation of and claims priority to U.S. patent application Ser. No. 14/282,185, filed May 20, 2014, entitled "System and Method for Selling Items via a Wireless Mobile Telecommunications System," now U.S. Pat. No. 9,396,495, which is incorporated by referenced herein in its entirety; and which is a continuation of and claims priority to U.S. patent application Ser. No. 11/742,228, filed on Apr. 30, 2007, entitled "System and Method for Selling Items via a Wireless Mobile Telecommunications System," now U.S. Pat. No. 8,737,974, which is incorporated by reference herein in its entirety.

BACKGROUND

The present invention relates generally to electronic commerce and, more specifically, to real-time electronic auctions and other real-time electronic sales transactions.

Broadcasts of so-called "infomercials" on various television channels and sales programs on dedicated shop-from-home television channels allow the public to view merchandise offered for sale and purchase desired items. Typically, when a person views a desired item, the person can buy the item by telephoning a toll-free number and verbally providing purchase information, such as a shipping address and method of payment, to an operator. The most typical method of payment is a credit card. Although this method of selling merchandise has become very popular, some buyers may find it cumbersome to divide one's attention between a television and telephone. Also, verbally conveying purchase information from the buyer to the operator is prone to error.

On-line electronic commerce ("e-commerce") is another method of selling merchandise. Internet web sites that conduct electronic auctions have become especially popular. Such web sites typically allow users to search for and view numerous items available for bidding. A user can bid on a desired item by entering the amount the user wishes to pay. Other users can do the same. The auction for a given item is typically of some pre-established duration, such as several hours or days. At the expiration of that time, the user who entered the highest bid is notified that he has won the auction. Upon confirmation, the winner pays the bid amount, typically by credit card or electronic payment.

Some on-line auction sites include a "buy now" feature that allows a user to purchase specified items without bidding, by agreeing to pay a pre-established price.

On-line auctions and similar e-commerce sales are not conducted in real-time and thus do not capture viewers' interest the way infomercials and shop-from-home television programs do. Also, they potentially expose buyers' sensitive personal information to theft by routing it through the Internet to sellers or other parties with whom the buyer may have no established and trusted relationship. A disadvantage of both television sales and on-line auctions and similar e-commerce sales is that users cannot actively participate in them while away from their televisions or computers.

It would be desirable to provide an improved e-commerce sales system and method that is secure, convenient to use, and provides an entertaining shopping experience. The present invention provides such a system and method in the manner described below.

SUMMARY

The present disclosure relates to a system and method for selling items via a wireless mobile telecommunications network in which multimedia presentations describing items offered for sale are broadcast for reception by wireless mobile devices. Users of the devices can transmit responses indicating requests to buy the items or bid for them in auctions. The real-time excitement of an auction can be simulated and experienced by users from any location where users have wireless mobile device service.

In one exemplary embodiment of the invention, the items are offered in an auction-like manner, in which users respond with bids. When an electronic commerce subsystem receives a response from a wireless mobile device, the electronic commerce subsystem determines if the response information meets transaction criteria that have been established, such as exceeding the then-highest bid. The electronic commerce subsystem collects bids submitted by the various wireless mobile device users and notifies the winner. A billing subsystem consults an account associated with the winner to determine if the winner has sufficient funds or, alternatively, credit. If the winner's account indicates sufficient funds or credit, the account is charged accordingly. Advantageously, the account can be that which is associated with providing the wireless mobile telecommunications network service itself to a user. The service provider can, for example, include a charge for the item on the same bill that the service provider normally sends monthly to subscribers. In this manner, sensitive personal information regarding the user and user's payment is not shared with third-party sellers of the items but rather is maintained in a secure manner in the subsystems of the same network service provider with whom the user has a continuing relationship.

In another exemplary embodiment of the invention, the items are offered for sale in a "buy now" manner that does not involve an auction. When the electronic commerce subsystem receives a response from a wireless mobile device indicating that a user would like to buy the item, the electronic commerce subsystem determines if the response information meets established transaction criteria. The billing subsystem consults an account associated with the winner to determine if the winner has sufficient funds or, alternatively, credit. If the winner's account indicates sufficient funds or credit, the account is charged accordingly. As described above, the account can advantageously be that which is associated with providing the wireless mobile telecommunications network service itself to the user.

In some embodiments of the invention, users can be offered a choice of both auction and "buy now" options.

DETAILED DESCRIPTION

Figure 1:
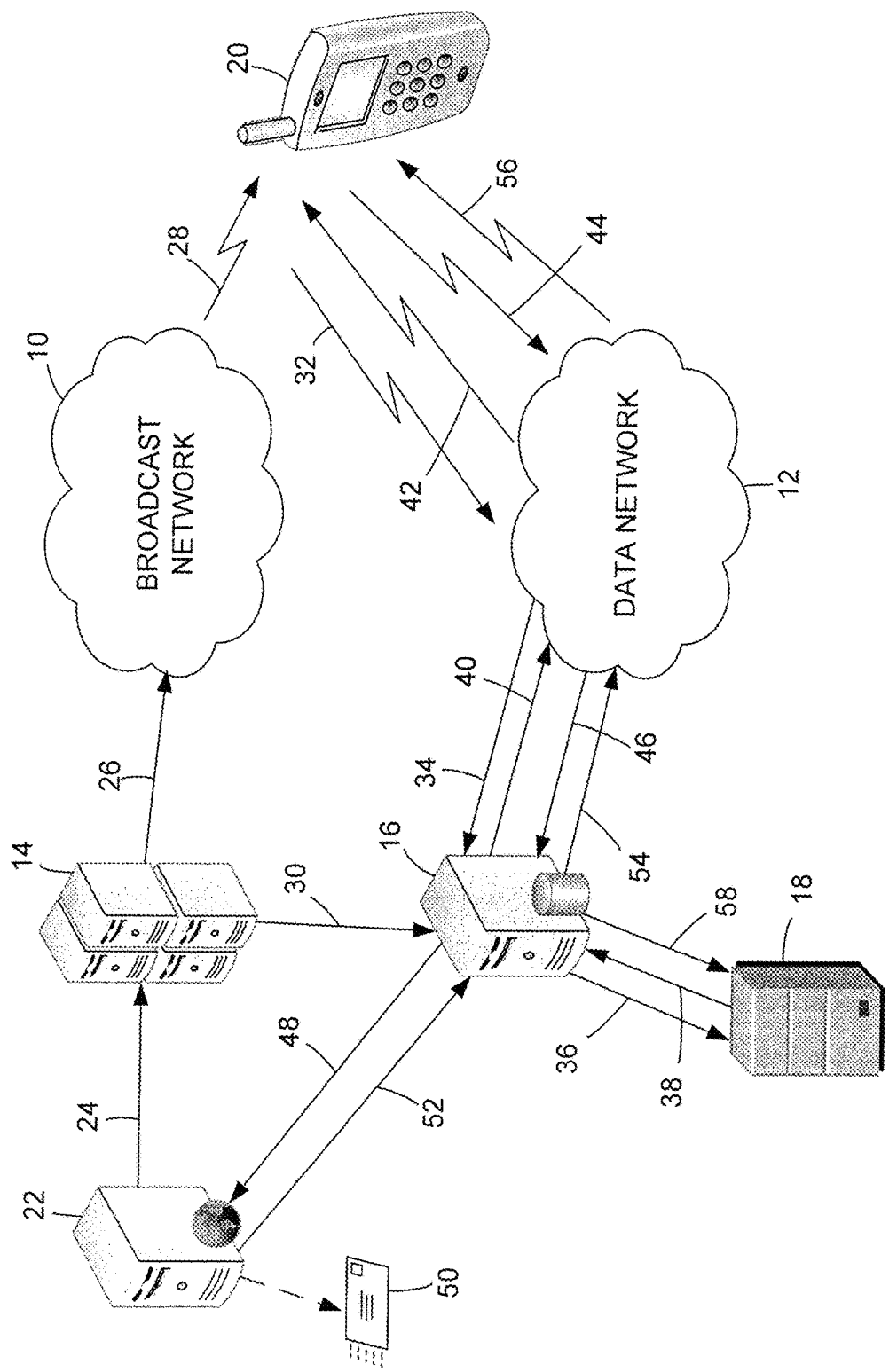
FIG. 1 is a diagram illustrating elements of a system and data flow among the elements in an exemplary embodiment of the invention in which items are offered for immediate ("buy now") sale via a wireless mobile telecommunications network.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

As illustrated in FIG. 1, in an exemplary embodiment of the invention, a system operated by a wireless mobile telecommunications service provider includes a broadcast network 10, a data network 12, a broadcast subsystem 14, an electronic commerce (e-commerce) subsystem 16, and a subscriber billing subsystem 18. Broadcast network 10 and data network 12 are of the types that commonly form the basis for wireless mobile (e.g., cellular) telecommunications systems, in which users of wireless mobile devices 20 move about a geographic region covered by the networks while making and receiving telephone calls, accessing the Internet or other data services, downloading files, viewing streaming video, etc. Although the manner in which networks 10 and 12 operate to provide such functions is well understood in the art and therefore not described in further detail herein, it can be noted that networks 10 and 12 can conform to any of the well-known standards suitable for providing the above-referenced functions, such as the General Packet Radio Service (GPRS), Enhanced Data rates for Global Evolution (EDGE), Universal Mobile Telecommunications System (UMTS), etc. Although broadcast network 10 and data network 12 are illustrated as separate elements, conceptually representing the manner in which data-centric telecommunications technologies such as GPRS and EDGE enhance second-generation (i.e., speech-centric) telecommunications technologies such as Global System for Mobile Telecommunications (GSM), in other embodiments the broadcast network and data network aspects of the invention can be more closely integrated, along the lines of so-called third-generation (3G) technologies such as UMTS and CDMA-2000. The illustrated elements and arrangements of the illustrated elements are shown only for the purposes of illustration, and any other suitable network arrangements and technologies can be used.

In addition to operating the above-described network elements in a manner that provides the novel shopping service described below, the network service provider operates the above-described network elements in the conventional manner, enabling users of wireless mobile devices 20 (i.e., subscribers to the service) to make and receive telephone calls, access the Internet or other data services, download files, view streaming video, etc. The network service provider charges such subscribers fees based upon various criteria, such as number of minutes of airtime, amount of data downloaded, etc. The service provider uses subscriber billing subsystem 18 to maintain accounts for the service provider's subscribers. Typically, an account in effect represents credit that the service provider extends the service provider's subscribers, and the service provider sends subscribers monthly bills for services provided during the preceding month. In some instances, however, accounts are pre-paid, and charges for services are debited from the account as the charges are incurred.

In the exemplary embodiment of the invention, the network service provider has a business arrangement with one or more third-party sellers who serve as the sources of items that are to be offered to the service provider's subscribers (i.e., users of wireless mobile devices 20). Each seller (or alternatively, a group of more than one such seller) can operate a source subsystem 22 that includes a database of items offered for sale, prices, quantities and other such relevant sales and inventory information, as well as multimedia presentations describing the items, as described in further detail below. The seller or other operator of source subsystem 22 can also physically control, e.g., warehouse and distribute, the items offered for sale. Alternatively, the operator of source subsystem 22 can function as a centralized hub or marketplace for other parties (not shown) who wish to offer items for sale.

It should be noted that each of subsystems 14, 16, 18, and 22 is essentially a server computer or other processing system of the type in which one or more processors or similar programmed logic devices (not shown) operate under software control or similar programming to effect corresponding processes or functions. Subsystems 14, 16, 18, and 22 can perform conventional functions that are characteristic of such network elements in addition to the novel functions described below with regard to exemplary methods of the present invention. For example, subscriber billing subsystem 18 is also used in the conventional manner to bill subscribers (i.e., users of wireless mobile devices 20) for conventional services, such as wireless voice and data communications.

As illustrated in FIG. 1, in accordance with an exemplary method of operation, a sequence of steps occurs in which data are communicated among the illustrated network elements and wireless mobile devices 20 to effect "buy now" (i.e., non-auction) sales of items. Persons skilled in the art to which the invention relates will readily be capable of programming or otherwise configuring subsystems 14, 16, 18, and 22 to effect the steps described below.

In a preliminary step, a communication 24 occurs between source subsystem 22 and broadcast subsystem 14 in which a multimedia presentation (e.g., in the form of one or more data files) is delivered to broadcast subsystem 14. The multimedia presentation describes one or more items that the seller is offering for sale via the "buy now" method of the present invention. The multimedia presentation can include still images (i.e., pictures) or moving images (i.e., video) of an item. It can also include a cost threshold for the item, such as the price at which the seller is offering the item, and the current quantity remaining in the seller's inventory. The price, images of the items, and other information, can be combined in any suitable manner in the presentation. For example, the price can be in the form of graphical characters superimposed on a video image of the item.

The communication 24 between source subsystem 22 and broadcast subsystem 14 can also include associated broadcast information that facilitates broadcast of the multimedia presentation, such as a geographic sub-area of the service provider's network in which the seller would like the item offered. In this manner, sellers can target selected geographic areas. As conventional wireless mobile telecommunications networks can extend nationwide or even across multiple countries, it is desirable to enable a seller to specify geographic regions, cities, postal codes, cell sites, etc., to which to restrict the offer.

A communication 26 occurs in which broadcast subsystem 14 provides the multimedia presentation and associated broadcast information to broadcast network 10. As described above, broadcast network 10 can represent that portion of a conventional wireless mobile telecommunications system that enables users of wireless mobile devices 20 to move about the region of network coverage while making and receiving telephone calls, accessing the Internet or other data services, downloading files, viewing streaming video, and performing other conventional operations.

Broadcast network 10 transmits a communication 28 comprising the multimedia presentation in the selected regions of broadcast network 10 in a broadcast or multicast manner, such that a number of wireless mobile devices 20 can receive the communication 28. For example, broadcast network 10 can employ any of various well-known wireless telecommunication network broadcast standards, such as Multimedia Broadcast-Multicast Service (MBMS), Media-FLO, and Digital Video Broadcasting-Handheld (DVB-H).

To participate in the shopping experience in this manner, a user of a wireless mobile device 20 can subscribe to a service offered by the service provider in which the subscriber indicates a desire to receive such sales offers. In setting up the subscription to this shopping service, the subscriber may indicate various preferences, such as categories of items in which the subscriber is interested, limits on the frequency or times of day at which the subscriber would like to receive such offers, etc. Alternatively, a subscriber can call a predetermined telephone number to initiate the shopping service. Wireless mobile device 20 can be pre-configured or provisioned to include a key or soft key (not shown) that the user presses to initiate reception of a multimedia presentation and participate in the shopping service. Wireless mobile device 20 can operate in part under control of a suitable applet (i.e., software, not shown) to facilitate the shopping service (methods) described herein. Although not described in further detail herein for purposes of clarity, the service can include features that allow the user to search for items by keyword or category or scroll through a list of items available for purchase.

Concurrently with the transmission of the multimedia presentation to wireless mobile devices 20, a communication 30 from broadcast subsystem 14 to e-commerce subsystem 16 identifies the item described in the multimedia presentation. While viewing the multimedia presentation, the subscriber can enter a quantity and press a "Buy Now" key or soft key (not shown) on wireless mobile device 20 to indicate that the subscriber would like to purchase the specified quantity of the item. In response, wireless mobile device 20 transmits a communication 32 via data network 12, which forwards the information to e-commerce subsystem 16 as another communication 34.

E-commerce subsystem 16 responds to communication 34 by performing steps needed to complete a sales transaction, such as adding tax and delivery costs to the price, and requesting verification from subscriber billing subsystem 18 that sufficient funds or, alternatively, credit exists in the subscriber's account to charge the total cost. Accordingly, e-commerce subsystem 16 sends a communication 36 to subscriber billing subsystem 18, which responds with a communication 38. Communication 38 can also include other information that e-commerce subsystem 16 may need to complete the transaction, such as an address to which the item can be delivered.

If consulting the subscriber's account as described above does not indicate any reason why the transaction should not proceed, a communication 40 occurs in which e-commerce subsystem requests that the user commit to the transaction. Data network 12 forwards this "Commit Request" to wireless mobile device 20 as a communication 42. Communication 42 can include the total cost, including any tax and shipping charges.

In response to a prompt requesting the subscriber's request to commit to the transaction and presenting the total cost, the subscriber can press a key or soft key (not shown) on wireless mobile device 20 to indicate the subscriber's confirmation or approval. The subscriber can also enter a shipping address. In response, wireless mobile device 20 transmits a communication 44 to data network 12, which forwards the information to e-commerce subsystem 16 as another communication 46. E-commerce subsystem 16 then sends a communication 48 to source subsystem 22 that indicates the quantity of the item purchased and the delivery address. Source subsystem 22 responds to communication 48 by performing steps needed to complete the sales transaction, such as determining if sufficient quantity exists in inventory and, if so, deducting the quantity from source subsystem 22 inventory database to reflect the sale. Source subsystem 22 also initiates any steps necessary to ensure that the buyer receives the item, such as initiating a shipping or delivery process 50. The item can be delivered via any suitable means known in the art. Source subsystem 22 also sends a communication 52 to e-commerce subsystem 16 that verifies the completion of the transaction. E-commerce subsystem 16 responds by closing the transaction and sending a corresponding "Purchase Confirmed" communication 54 to data network 12. Data network 12 in turn sends a communication 56 to wireless mobile device 20, confirming completion of the transaction. Concurrently, with these confirmation communications, e-commerce subsystem 16 sends a similar communication 58 to subscriber billing subsystem 18. Subscriber billing subsystem 18 charges the subscriber's account with the total cost. As described above, charging the account can include debiting a balance or, alternatively, indicating that credit has been extended until the network service provider sends the subscriber's next monthly bill, which will include a charge for the cost of item. The network service provider can forward to the seller amounts that the service provider collects on the seller's behalf for such sales. Various other business arrangements between the parties that accomplish a similar result will occur readily to persons of skill in the art in view of these teachings.

Figure 2:
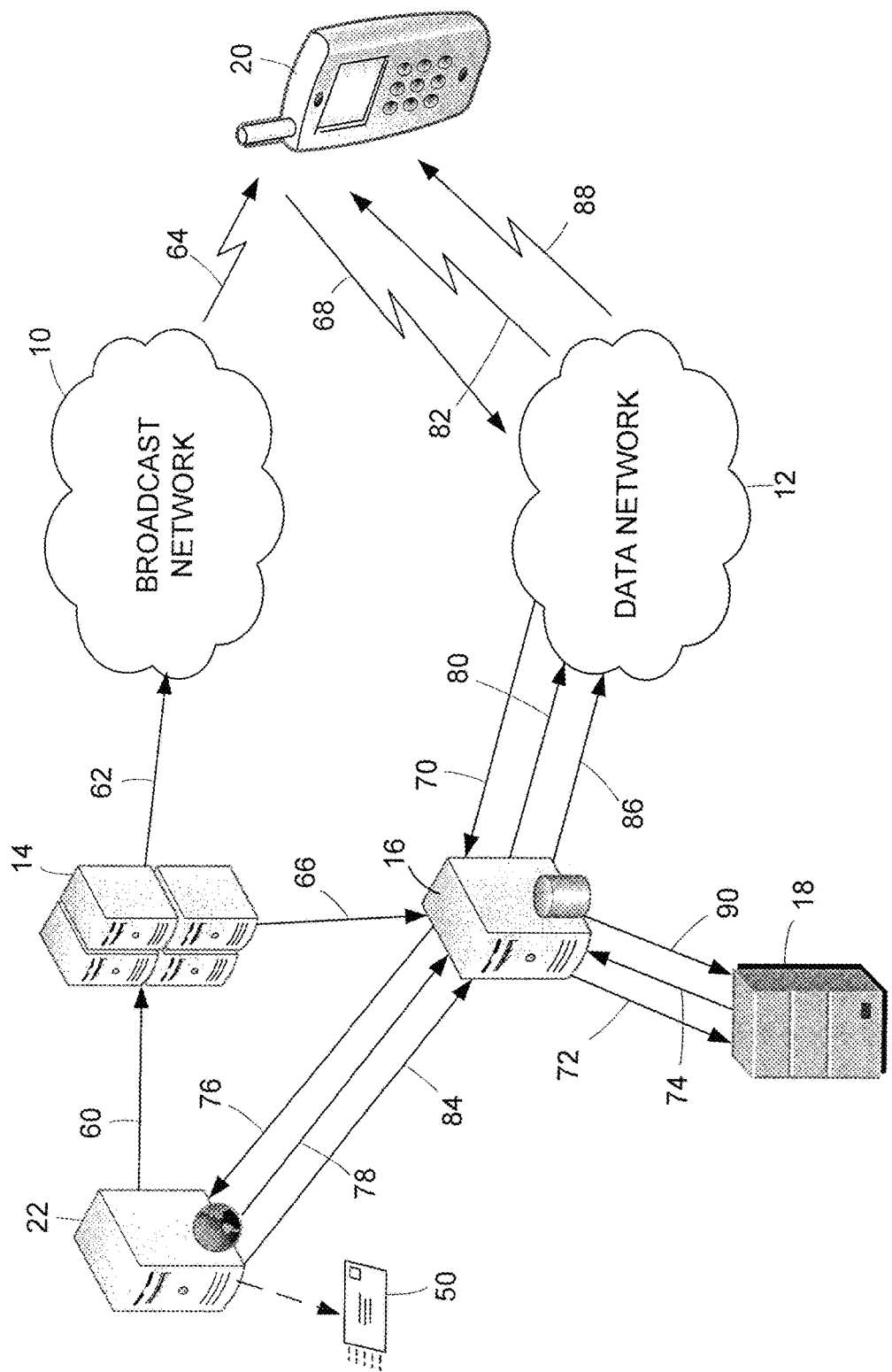
FIG. 2 is a diagram illustrating elements of a system and data flow among the elements in an exemplary embodiment of the invention in which items are offered at auction via a wireless mobile telecommunications network.

As illustrated in FIG. 2, in accordance with another exemplary method of operation, a sequence of steps occurs in which data is communicated among the illustrated network elements and wireless mobile devices 20 to effect auctions of items. In some embodiments of the invention, the method can be used in conjunction with the method described above, to afford users a choice between auction and "buy now" shopping methods. For example, some items may be offered for immediate sale, while other items may be offered at auction. Persons skilled in the art to which the invention relates will readily be capable of programming or otherwise configuring subsystems 14, 16, 18, and 22 to effect the steps described herein.

As in the exemplary method described above with regard to FIG. 1, a communication 60 occurs between source subsystem 22 and broadcast subsystem 14 in which a multimedia presentation (e.g., in the form of one or more data files) is delivered to broadcast subsystem 14. The multimedia presentation describes one or more items that the seller is offering at auction. The multimedia presentation can include still images (i.e., pictures) or moving images (i.e., video) of an item. The multimedia presentation can also include a cost threshold for the item, such as the current highest bid. The communication 60 between source subsystem 22 and broadcast subsystem 14 can also include associated broadcast information to facilitate broadcast of the multimedia presentation, such as a geographic sub-area of the service provider's network in which the seller would like the item offered.

A communication 62 occurs in which broadcast subsystem 14 provides the multimedia presentation and associated broadcast information to broadcast network 10. As described above, broadcast network 10 can represent that portion of a conventional wireless mobile telecommunications system which enables users of wireless mobile devices 20 to move about the region of network coverage while making and receiving telephone calls, accessing the Internet or other data services, downloading files, viewing streaming video, and performing other conventional operations.

To simulate a real auction, in which bidders are personally present before an auctioneer, the multimedia presentation can include an image of an auctioneer, such as a video image of a real person or an animation featuring an auctioneer character. The current highest bid, image of the item, auctioneer, etc., can be combined in any suitable manner in the presentation. For example, the current highest bid can be in the form of graphical characters superimposed on a video image of the item. Alternatively, for example, the voice of the animated auctioneer character can state the current highest bid.

Broadcast network 10 transmits a communication 64 comprising the multimedia presentation in the selected regions of broadcast network 10 in a broadcast or multicast manner, such that a number of wireless mobile devices 20 can receive the communication 64. As described above with regard to the "buy now" method of FIG. 1, broadcast network 10 can employ any of various well-known wireless telecommunication network broadcast standards, such as MBMS, MediaFLO, and DVB-H.

As in the above-described method, subscribers can subscribe to a service offered by the service provider in which the subscriber indicates a desire to receive such auction presentations. In setting up the subscription to this shopping service, the subscriber may indicate various preferences, such as categories of items in which the subscriber is interested, limiting the frequency or times of day at which the subscriber would like to participate in auctions, etc. Alternatively, a subscriber can call a predetermined telephone number to search for and enter an auction. Wireless mobile device 20 can be pre-configured or provisioned to include a key or soft key (not shown) that the user presses to initiate reception of a multimedia presentation and participate in the auction service.

Concurrently with the transmission of the multimedia presentation to wireless mobile devices 20, a communication 66 from broadcast subsystem 14 to e-commerce subsystem 16 identifies the item described in the multimedia presentation. While viewing the multimedia presentation, the subscriber can enter a bid and press a "Bid" key or soft key (not shown) on wireless mobile device 20 to indicate that the subscriber would like to submit a bid for the item. In response, wireless mobile device 20 transmits a communication 68 to data network 12, which forwards the information to e-commerce subsystem 16 as another communication 70.

E-commerce subsystem 16 responds to communication 70 by performing steps needed to process the bid or otherwise determine whether it meets pre-established criteria, such as requesting verification from subscriber billing subsystem 18 that sufficient funds or, alternatively, credit exists in the subscriber's account to charge the amount of the bid. Accordingly, e-commerce subsystem 16 sends a communication 72 to subscriber billing subsystem 18, which responds with a communication 74. Communication 74 can also include other information that e-commerce subsystem 16 may need to complete the transaction, such as an address to which the item can be delivered if the auction is won.

If consulting the subscriber's account as described above does not indicate any reason why the transaction should not proceed, e-commerce subsystem sends a communication 76 to source subsystem 22 that indicates the bid amount. Source subsystem 22 responds to communication 76 by performing steps needed to process the bid or otherwise determine whether the bid meets pre-established criteria, such as determining if the bid is currently the highest. Source subsystem 22 sends a communication 78 to e-commerce subsystem 16 that indicates whether the subscriber's bid is currently the highest or whether the subscriber has been outbid by another. E-commerce subsystem 16 forwards this response to data network 12 as another communication 80. Data network 12 in turn sends a corresponding communication 82 to wireless mobile device 20. In response, wireless mobile device 20 indicates to the subscriber whether the subscriber has been outbid or is currently the highest bidder. If the subscriber has been outbid, the subscriber can place another bid in the manner described above.

Source subsystem 22 monitors the progress of the auction and tracks the current highest bidder. Upon expiration of the predetermined time interval during which the auction is active, i.e., during which bids are accepted, source subsystem 22 sends a communication 84 to notify the winner, i.e., the subscriber whose bid was highest at the time the auction expired. E-commerce subsystem 16 forwards this information as a communication 86 to data network 12. Data network 12 in turn sends a corresponding communication 88 to wireless mobile device 20. Note that although in the exemplary embodiment of the invention source subsystem 22 is the network element that monitors the auction, in other embodiments e-commerce subsystem 16 or other suitable network element can perform this function.

At the expiration of the auction, e-commerce subsystem 16 sends a communication 90, identifying the winner, to subscriber billing subsystem 18. Subscriber billing subsystem 18 charges the winning subscriber's account with the total cost. As described above, charging the account can include debiting a balance or, alternatively, indicating that credit has been extended until the service provider sends the subscriber's next monthly bill, which will include a charge for the cost of item (i.e., the winning bid amount plus any additional tax, shipping cost, etc.).

Figure 3:
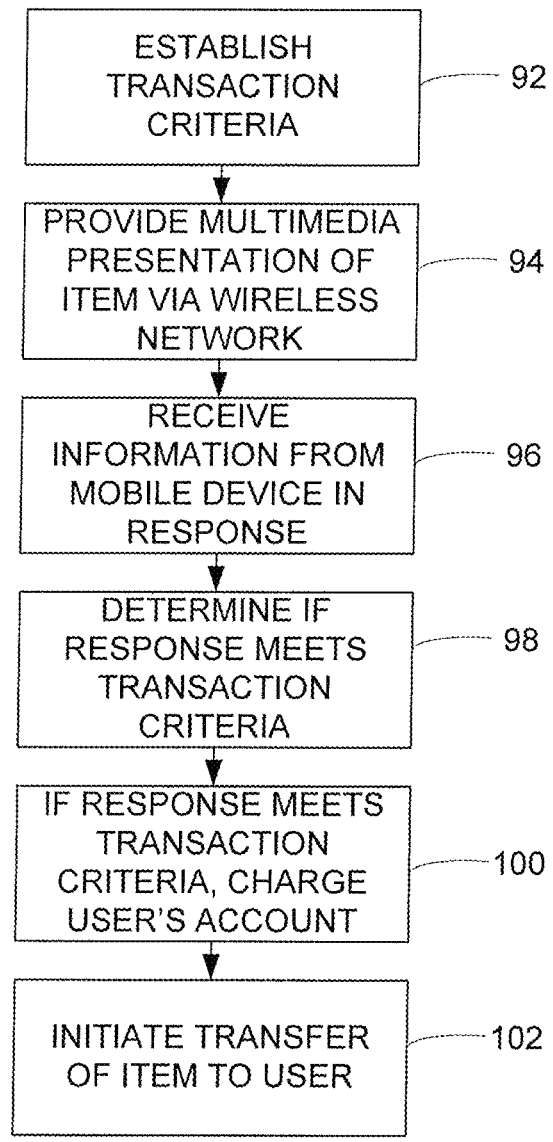
FIG. 3 is a flow diagram illustrating an exemplary method for selling items via a wireless mobile telecommunications network using auction or immediate sale options.

The above-described exemplary methods can be summarized as illustrated in FIG. 3. As indicated by step 92, transaction criteria are established for an item, such as by source subsystem 22 storing a price or keeping track of the highest bid. As indicated by step 94, a multimedia presentation that has been stored in source subsystem 22 can be transmitted by broadcast network 10 for distribution to wireless mobile devices 20. As indicated by step 96, e-commerce subsystem 16 can receive information from a wireless mobile device 20 representing the subscriber's desire to obtain the item by purchasing or, alternatively, bidding on the item. In the case of a purchase, the information can include the desired quantity of the item.

As indicated by step 98, it is determined whether the response received from wireless mobile device 20 meets the established transaction criteria. For example, in the case of the response indicating a desire to purchase the item, the determination can involve e-commerce subsystem 16 determining from subscriber billing subsystem 18 whether the user's account has sufficient balance or credit to cover the purchase and determining from source subsystem 22 whether the requested quantity of the item exists in inventory. In the case of the response indicating a desire to bid on the item, the determination can involve source subsystem 22 determining whether the bid is the current highest bid or whether the subscriber has been outbid. The determination also involves determining the auction winner at the expiration of the auction.

As indicated by step 100, subscriber billing system 18 charges the subscriber's account if it is determined that the information received from wireless mobile device 20 meets the transaction criteria. As indicated by step 102, source subsystem 22 also initiates transfer of the item to the user if the transaction criteria are met.

The present invention sells items in a manner that captures viewers' interest the way that infomercials and shop-from-home television programs do. Auctions can occur in real time, i.e., at nearly the same pace as if the subscriber were sitting in an auction house in front of an auctioneer. The multimedia presentation can even include images and voice of a real or animated auctioneer. However, subscribers are not limited in where they can participate in auctions, as they can move from place to place while using wireless mobile devices 20 in accordance with the present invention in the same manner in which they can move about while using wireless mobile devices 20 for conventional purposes such as making and receiving telephone calls. Also, charging a subscriber for items through the same subscriber billing subsystem 18 that the network service provider uses to charge the subscriber for conventional services such that, for example, the charge for the item appears on the subscriber's regular monthly bill along with such conventional charges, limits exposure of the subscriber's sensitive personal information to only the same party, i.e., the service provider, with whom the subscriber has had an ongoing relationship. Nevertheless, other suitable charging arrangements can be used in other embodiments of the invention.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

The invention claimed is:

1. A method comprising:
  receiving, from a first wireless mobile device and by a system comprising a processor, an electric commerce system, and a subscriber billing subsystem, a request to subscribe to a service, the request comprising
    an indication of a desire to receive a sales offer comprising a multimedia presentation that represents an item that is for sale, wherein the multimedia presentation comprises a first data file and a second data file, the first data file comprising an indication that the item is for sale and a current highest auction bid, and the second data file comprising a video of the item that is for sale, and
    a sales preference associated with a subscription to the service, the sales preference comprising a limit on times of day in which the sales offer is to be received;
  establishing transaction criteria for an item in an auction;
  identifying, by the system, a targeted geographic sub-area of a geographic area that is covered by a cellular broadcast subsystem of a wireless mobile telecommunications network;
  referencing the sales preference to determine that the first wireless mobile device is eligible to participate in the auction;
  providing, by the system and to the first wireless mobile device and a second wireless mobile device, the multimedia presentation via a broadcast that is restricted to the targeted geographic sub-area;
  receiving, by the system and from the second wireless mobile device, a second bid to obtain the item, wherein the second bid is lower than the first bid;
  determining, by an electronic commerce subsystem, that the first bid received from the first wireless mobile device meets the transaction criteria by determining that a first account associated with the first wireless mobile device has sufficient funds to satisfy the first bid;
  determining, by the electronic commerce subsystem, that the second bid received from the second wireless mobile device meets the transaction criteria by determining that a second account associated with the second wireless mobile device has sufficient funds to satisfy the second bid;
  in response to determining that the first bid meets the transaction criteria and that the first bid is higher than the second bid, increasing, by the electronic commerce subsystem, the current highest auction bid to the first bid;
  after the auction expires, determining that the current highest auction bid corresponds to the first bid; and
  in response to determining that the current highest auction bid corresponds to the first bid,
    charging, by the subscriber billing subsystem, the first account associated with the first wireless mobile device,
    initiating, by the electronic commerce subsystem, transfer of the item, and
    transferring, by the electronic commerce subsystem, a collected amount collected from the auction on behalf of a seller of the item to the seller.

2. The method of claim 1, further comprising:
  receiving, from a source subsystem, the multimedia presentation with broadcast information, wherein the system identifies the targeted geographic sub-area based on the broadcast information.

3. The method of claim 2, wherein the source subsystem comprises a database of items offered for sale, prices for the items, quantities of the items, inventory information for the items, and multimedia presentations describing the items.

4. The method of claim 3, further comprising:
  initiating delivery of the item to a delivery address associated with the first wireless mobile device, wherein the delivery address is determined based on the first account.

5. The method of claim 1, wherein the targeted geographic sub-area is a cell site.

6. The method of claim 1, further comprising:
determining, based on the first account, a delivery address associated with the first wireless mobile device;
initiating delivery of the item to the delivery address; and
obtaining, from the first account, funds for a purchase of the item.

7. A system comprising:
an electronic commerce system;
a subscriber billing subsystem; and
a processor that performs functions comprising
receiving, from a first wireless mobile device, a request to subscribe to a service, the request comprising
an indication of a desire to receive a sales offer comprising a multimedia presentation that represents an item that is for sale, wherein the multimedia presentation comprises a first data file and a second data file, the first data file comprising an indication that the item is for sale and a current highest auction bid, and the second data file comprising a video of the item that is for sale, and
a sales preference associated with a subscription to the service, the sales preference comprising a limit on times of day in which the sales offer is to be received,
establishing transaction criteria for an item in an auction,
identifying a targeted geographic sub-area of a geographic area that is covered by a cellular broadcast subsystem of a wireless mobile telecommunications network,
referencing the sales preference to determine that the first wireless mobile device is eligible to participate in the auction,
providing, to the first wireless mobile device and a second wireless mobile device, the multimedia presentation via a broadcast that is restricted to the targeted geographic sub-area,
receiving, from the first wireless mobile device, a first bid to obtain the item, wherein the first bid exceeds the current highest auction bid,
receiving, from the second wireless mobile device, a second bid to obtain the item, wherein the second bid is lower than the first bid,
determining, by an electronic commerce subsystem, that the first bid received from the first wireless mobile device meets the transaction criteria by determining that a first account associated with the first wireless mobile device has sufficient funds to satisfy the first bid,
determining, by the electronic commerce subsystem, that the second bid received from the second wireless mobile device meets the transaction criteria by determining that a second account associated with the second wireless mobile device has sufficient funds to satisfy the second bid,
in response to determining that the first bid meets the transaction criteria and that the first bid is higher than the second bid, increasing, by the electronic commerce subsystem, the current highest auction bid to the first bid,
after the auction expires, determining that the current highest auction bid corresponds to the first bid, and
in response to determining that the current highest auction bid corresponds to the first bid,
charging, by the subscriber billing subsystem, the first account associated with the first wireless mobile device,
initiating, by the electronic commerce subsystem, transfer of the item, and
transferring, by the electronic commerce subsystem, a collected amount collected from the auction on behalf of a seller of the item to the seller.

8. The system of claim 7, wherein the targeted geographic sub-area is identified based on broadcast information that is received with the multimedia presentation.

9. The system of claim 7, wherein the targeted geographic sub-area is a cell site.

10. The system of claim 9, wherein the functions further comprise:
receiving, from a source subsystem, the multimedia presentation with broadcast information, wherein the system identifies the targeted geographic sub-area based on the broadcast information.

11. The system of claim 10, wherein the source subsystem comprises a database of items offered for sale, prices for the items, quantities of the items, inventory information for the items, and multimedia presentations describing the items.

12. The system of claim 10, wherein the processor performs functions further comprising:
determining, based on the first account, a delivery address associated with the first wireless mobile device;
initiating delivery of the item to the delivery address; and
obtaining, from the first account, funds for a purchase of the item.

13. A method comprising:
receiving, from a first wireless mobile device and by a system comprising a processor, an electric commerce system, and a subscriber billing subsystem, a request to subscribe to a service, the request comprising
an indication of a desire to receive a sales offer comprising a multimedia presentation that represents an item that is for sale, wherein the multimedia presentation comprises a first data file and a second data file, the first data file comprising an indication that the item is for sale and a current highest auction bid, and the second data file comprising a video of the item that is for sale, and
a sales preference associated with a subscription to the service, the sales preference comprising a limit on times of day in which the sales offer is to be received;
establishing transaction criteria for an item in an auction;
identifying, by the system, a targeted geographic sub-area of a geographic area that is covered by a cellular broadcast subsystem of a wireless mobile telecommunications network;
referencing the sales preference to determine that the first wireless mobile device is eligible to participate in the auction;
providing, by the system and to the first wireless mobile device and a second wireless mobile device, the multimedia presentation via a broadcast that is restricted to the targeted geographic sub-area; receiving, by the system and from the first wireless mobile device, a first bid to obtain the item, wherein the first bid exceeds the current highest auction bid;
receiving, by the system and from the second wireless mobile device, a second bid to obtain the item, wherein the second bid is lower than the first bid;
determining, by an electronic commerce subsystem, that the first bid received from the first wireless mobile device meets the transaction criteria by determining that a first account associated with the first wireless mobile device has sufficient funds to satisfy the first bid;

determining, by the electronic commerce subsystem, that the second bid received from the second wireless mobile device meets the transaction criteria by determining that a second account associated with the second wireless mobile device has sufficient funds to satisfy the second bid;

in response to determining that the first bid meets the transaction criteria and that the first bid is higher than the second bid, increasing, by the electronic commerce subsystem, the current highest auction bid to the first bid;

after the auction expires, determining that the current highest auction bid corresponds to the first bid; and in response to determining that the current highest auction bid corresponds to the first bid,
- charging, by the subscriber billing subsystem, the first account associated with the first wireless mobile device,
- initiating, by the electronic commerce subsystem, transfer of a collected amount collected from the auction on behalf of a seller of the item to the seller.

14. The method of claim 13, wherein the targeted geographic sub-area is targeted by the seller.

15. The method of claim 13, wherein the targeted geographic sub-area is a cell site.

16. The method of claim 15, further comprising:
receiving, from a source subsystem, the multimedia presentation with broadcast information, wherein the system identifies the targeted geographic sub-area based on the broadcast information.

17. The method of claim 16,
wherein the source subsystem comprises a database of items offered for sale, prices for the items, quantities of the items, inventory information for the items, and multimedia presentations describing the items.

18. The method of claim 16, further comprising:
determining, based on the first account, a delivery address associated with the first wireless mobile device;
initiating delivery of the item to the delivery address; and
obtaining, from the first account, funds for a purchase of the item.

* * * * *